US007783253B2

(12) United States Patent
Nettleship

(10) Patent No.: US 7,783,253 B2

(45) Date of Patent: Aug. 24, 2010

(54) SECURITY SYSTEM AND METHOD FOR PROTECTING ELECTRONIC DEVICES

(75) Inventor: Paul Nettleship, München (DE)

(73) Assignee: Agere Systems Inc., Allentown, PA (US)

( * ) Notice: Subject to any disclaimer, the term of this patent is extended or adjusted under 35 U.S.C. 154(b) by 1037 days.

(21) Appl. No.: 11/281,130

(22) Filed: Nov. 17, 2005

(65) Prior Publication Data

US 2007/0109092 A1 May 17, 2007

(51) Int. Cl.
*H04B 1/16* (2006.01)

(52) U.S. Cl. ................................ 455/41.1; 340/310.11

(58) Field of Classification Search ....................... None
See application file for complete search history.

(56) References Cited

U.S. PATENT DOCUMENTS 4,514,594 A * 4/1985 Brown et al. ................ 455/401
5,347,267 A * 9/1994 Murray ...................... 340/5.24
5,491,463 A * 2/1996 Sargeant et al. ........ 340/310.01

* cited by examiner

*Primary Examiner*—Thanh C Le

(57) ABSTRACT

A method of restricting operation of at least one electrical device connectable to a site electrical power supply system and an electrical device and transmitting device for operating in accordance with the method. In one embodiment, the method includes: (1) receiving a signal including a site identification code via the site electrical power supply system and extracting the site identification code by the at least one electrical device, (2) determining a correspondence between the site identification code and a site confirmation code stored in a memory of the at least one electrical device and (3) allowing unrestricted operation of the at least one electrical device only when the site identification and site confirmation codes correspond.

21 Claims, 3 Drawing Sheets

SECURITY SYSTEM AND METHOD FOR PROTECTING ELECTRONIC DEVICES

TECHNICAL FIELD OF THE INVENTION

The present invention is directed, in general, to security systems and, more particularly, to a security system and method for protecting electronic devices.

BACKGROUND OF THE INVENTION

Today a typical household is equipped with a large number of valuable electronic devices, such as TV sets, high-fidelity audio components and desktop computers, which are electrically powered by means of a site electrical power supply system. Due to the value and portability, the risk of theft of such devices is high.

Typically, electrical devices are provided with physical markings, such as serial numbers. These serial numbers can be registered. However, a stolen device is still operational and often cannot be identified, since physical markings can be removed.

Anti-theft systems designed to sound an alarm when an unauthorized person attempts to shoplift an electrical device are often used in stores. For this purpose typically a security tag is attached to the electrical devices on sale. When such security tag is moved into the proximity of a detecting device, which is typically located at the exit of the store, an alarm goes off. For example, U.S. Patent Application Publication No. 2001/0035822A1 describes such a security tag. Unfortunately, the described anti-theft system used in stores is too expensive for use in a residential environment and impractical for use in an office environment.

Accordingly, what is needed in the art is a novel approach to securing electrical devices against theft, and particularly in the context of a particular site, such as a residence or office.

SUMMARY OF THE INVENTION

To address the above-discussed deficiencies of the prior art, the present invention provides, in one aspect, a method of restricting operation of at least one electrical device connectable to a site electrical power supply system. In one embodiment, the method includes: (1) receiving a signal including a site identification code via the site electrical power supply system and extracting the site identification code by the at least one electrical device, (2) determining a correspondence between the site identification code and a site confirmation code stored in a memory of the at least one electrical device and (3) allowing unrestricted operation of the at least one electrical device only when the site identification and site confirmation codes correspond.

In another aspect, the present invention provides an electrical device connectable to a site electrical power supply system. In one embodiment, the electrical device includes: (1) a memory configured to store at least one site confirmation code, (2) a receiver coupled to the memory and configured to receive a signal transmitted by a transmitting device via the site electrical power supply system, (3) an extractor coupled to the receiver and configured to extract a site identification code from a received signal, (4) a comparator coupled to the extractor and configured to compare the site identification code with the site confirmation code and (5) a controller coupled to said comparator and configured to allow unrestricted operation of the electrical device only when the site identification and site confirmation codes correspond.

In yet another aspect, the present invention provides a transmitting device connectable to a site electrical power supply system. In one embodiment, the transmitting device includes: (1) a signal generator configured to generate a signal that includes a site identification code receivable by at least one electrical device wherein the electrical device is via the site electrical power supply system and (2) a transmitter coupled to the signal generator and configured to transmit the signal via the site electrical power supply system.

The foregoing has outlined preferred and alternative features of the present invention so those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
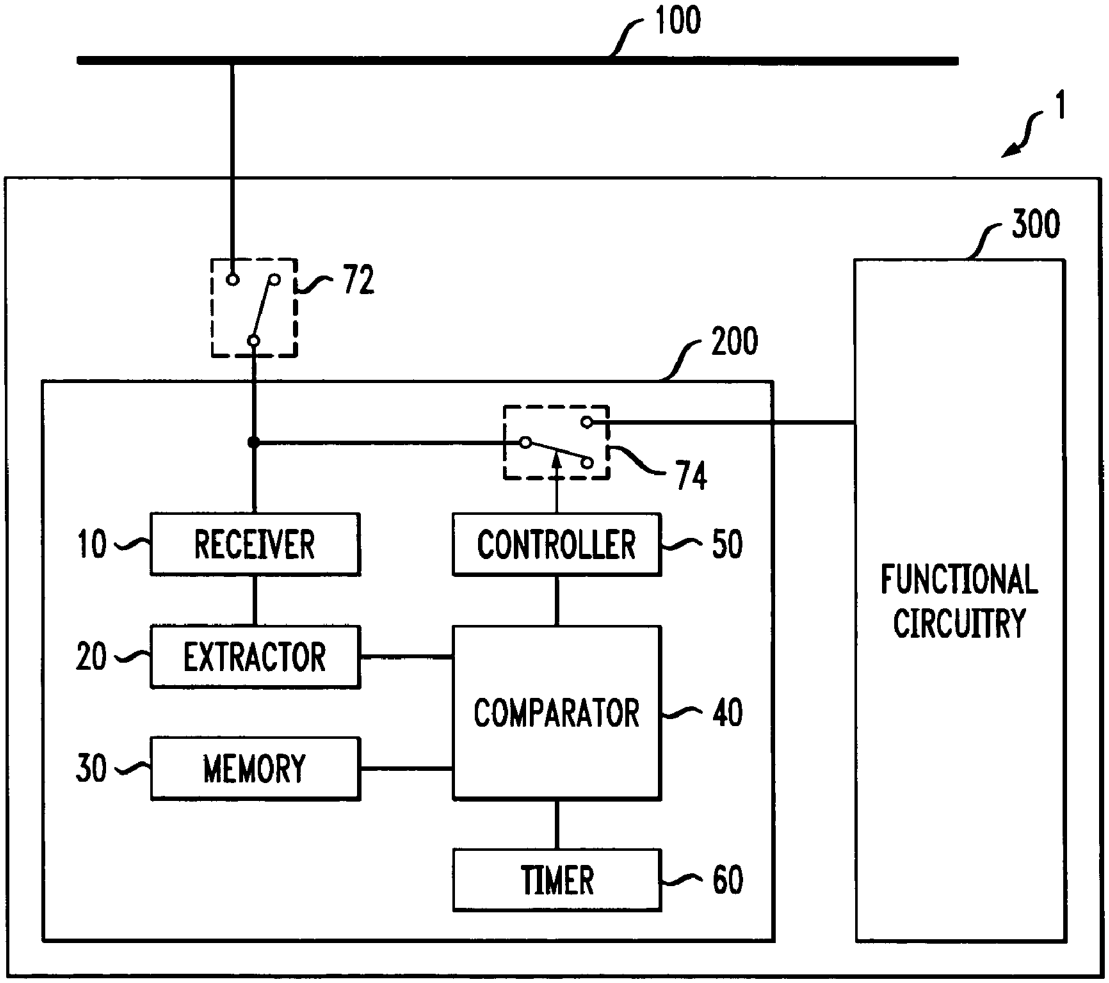
FIG. 1 illustrates a high-level block diagram of one embodiment of an electronic device configured to function in conjunction with a system or method for protecting the electronic device constructed or carried out according to the principles of the present invention.

Described herein is one aspect of the present invention that takes the form of a method for restricting operation of at least one electrical device connectable to a site electrical power supply system. In one embodiment of the method, a site confirmation code is stored in memory associated with the at least one electrical device. A signal is transmitted via the site electrical power supply system by a transmitting device, wherein the transmitting device is coupled to the site electrical power supply system and the signal comprises a site identification code. The signal is received and the site identification code is extracted by the at least one electrical device. A correspondence between the site identification code and the site confirmation code is determined. The at least one electrical device is allowed to operate in an unrestricted manner only when the second and site confirmation codes correspond.

In one embodiment, the correspondence occurs when the second and site confirmation codes match. Alternatively, the second and site confirmation codes could correspond to one another by a mathematical function or manipulation. This would allow, for example, the site confirmation code to be different from the site identification code, ostensibly to hide the identity of the site confirmation code. Alternatively, the site identification code could be a function of time (e.g., change daily). A correspondence could be drawn by comparing the second information with the site confirmation code and, for example, the current date or time.

The site identification code can correspond to a single physical site or, alteratively, to multiple physical sites that are associated with one another in some way. Examples of the latter include multiple sites under common ownership or tenancy and multiple sites (either for business or personal use) and multiple sites secured in a similar way (e.g., protected by the same security company). The term "site" therefore includes the plural and is to be defined broadly.

The described method therefore uses the existing site electrical wiring for transmitting a site identification code, for instance a signature key, that electrical devices, such as appliances and stereo or home theater components, can monitor. Their use is restricted, and perhaps extremely so, in the absence of the site identification code, which frustrates their use in locations outside of the site.

In this way, appliance theft is discouraged by perhaps rendering the appliance totally useless when removed to other locations. Alternatively, the appliance may still be able to function, but only in a restricted way (e.g., temporarily or only certain operational modes) or perhaps only in special (e.g., alarm) modes. Theft of household electrical devices is discouraged by tying the devices to a site-specific electrical power supply system. Security can therefore be built into electrical devices in a way that requires little or no user interaction.

The storing of the site confirmation code in the memory of the at least one electrical device may include changing the at least one electrical device from a first operating state to a second operating state wherein in the first operating state unrestricted operation is allowed. The site confirmation code may be automatically stored in memory of the at least one electrical device, when a signal including the site confirmation code is received for the first time.

Thus, in one embodiment, first and second operating states of the electrical device are provided, which can be called a "sale" state and a "locked" state, respectively. In the sale state, the electrical device may be made to display that the device is available, along with instructions on how to lock the device. When the device is changed to the locked state, the site confirmation code received via the electrical supply system is stored in non-volatile memory of the device. In the locked state, and upon turning on the device, the device awaits a signal including a site identification code to be received via the electrical supply system. If this is different from the stored site confirmation code, the device ceases unrestricted operation, perhaps by turning itself off or alarming.

For easily securing several electrical devices at the same time, the signal transmitted by the transmitting device advantageously is a broadcast signal received by at least substantially all electrical devices coupled to the site electrical power supply system.

In some embodiments, the site identification and site confirmation codes are digital codes of pre-defined length. optionally, a given minimum length can be defined to provide a desired security level.

To secure the transmitting device against tampering, the site identification code may be unchangeably stored in the transmitting device by the manufacturer and uniquely identify the transmitting device, so any electrical device locked to it is not functional in combination with any other transmitting device. Alternatively the site identification code can also be manually entered into the transmitting device by a user, so the site identification code is known only to the authorized user, thereby enabling a transmitting device having a defect to be exchanged easily. To provide mobility, the transmitting device may be detachably coupled to the site electrical power supply system.

Since typically only a short digital code is transmitted, simple, conventional protocols can be integrated in the transmitting device and the at least one electrical device in a straightforward manner. Alternatively, signal transmission from the transmitting device to the at least one electrical device can also be performed by means of a conventional network protocol, in particular one of Transmission Control Protocol/Internet Protocol (TCP/IP), Network Basic Input/Output System Extended User Interface (NetBEUI) or Internetwork Packet Exchange/Sequenced Packet Exchange (IPX/SPX) protocols. protocols.

Also described herein is another aspect of the present invention that takes the form of an electrical device connectable to a site electrical power supply system. In one embodiment, the electrical device includes memory for storing at least one site confirmation code, a receiver for receiving a signal transmitted by a transmitting device via the site electrical power supply system, an extractor for extracting a site identification code from a received signal, a comparator (hardware or software that compares) for comparing the site identification code with the site confirmation code, and a controller for controlling unrestricted operation of the device depending on matching site identification and site confirmation codes. Functional operation of the device is typically provided only when a site identification code that matches the site confirmation code is received. If a different or no site identification code is received the electrical device may be turned off or otherwise changed as described above. Accordingly, the controller may configured to turn the device off when matching site identification and site confirmation codes are not detected. Upon turning on, the electrical device may wait a pre-defined time interval for receiving a corresponding site identification code before ceasing unrestricted operation. The electrical device therefore operates in an unrestricted manner in the home of an authorized user, where an appropriate transmitting device is present, but does not function when moved to a different location or when stolen.

In one embodiment, the inventive device is provided with first and second operating states wherein in the first operating state the unrestricted operation of the device is not restricted. In the first operating state the device may be configured to receive a signal which comprises a site confirmation code, to extract the site confirmation code and to automatically store it in the memory. The device may change from the first operating state to the second operating state when a signal including the site confirmation code is received for the first time.

The inventive electrical device may be configured for manual entry of the site confirmation code, so the user can manually adapt his electrical devices to his transmitting device. If conventional network protocols are employed, the electrical device may be configured for receiving data by means of a conventional network protocol, in particular one of TCP/IP, NetBEUI or IPX/SPX protocols.

Also described herein is another aspect of the present invention that takes the form of a transmitting device connectable to a site electrical power supply system. In one embodiment, the transmitting device includes a signal generator for generating a signal that includes a site identification code receivable by at least one electrical device via the site electrical power supply system and a transmitter for transmitting the signal via the site electrical power supply system.

The signal transmitted by the transmitting device may be a broadcast signal receivable by all electrical devices that are coupled to the site electrical power supply system. The site identification code transmitted by the transmitting device can comprise a master code to which a number of codes of electrical devices are valid matching codes, so different electrical devices can be provided with different codes and still be functionally operational when receiving the master-code transmitted by the transmitting device.

As described above, the site identification code may be unchangeably stored in the transmitting device by the manufacturer for tamper prevention and preferably uniquely identifies the transmitting device. Alternatively the transmitting can also be configured for user entry of the site identification code. The transmitting device can further be configured for network communication over the electrical supply system by means of conventional network protocols.

An anti-theft system also lies within the scope of the present invention. One embodiment of the anti-theft system includes a site electrical power supply system, a transmitting device as described above and at least one electrical device as described above wherein the transmitting device and the at least one electrical device are coupled to the site electrical power supply system.

Having described several aspects and embodiments of the present invention generally, reference will now be made to the FIGUREs. Various techniques for transmission and receipt of digital data over electric supply systems are known (see, e.g., U.S. Pat. No. 6,674,806—"Transmitting and Receiving System for Digital Communication on Electric Power-Lines;" U.S. Pat. No. 6,559,757—"Data Communication Over Power Lines;" U.S. Pat. No. 6,509,831—"Coupler for Digital Communication on Electric Power-Lines;" U.S. Pat. No. 6,496,104—"System and Method for Communication Via Power Lines Using Ultra-Short Pulses;" U.S. Pat. No. 6,281,784—"Information and Control Communication Over Power Lines;" U.S. Pat. No. 6,154,488—"Low Frequency Bilateral Communication Over Distributed Power Lines;" U.S. Pat. No. 5,929,749—"System for Improved Communication and Control Over Power Lines;" U.S. Pat. No. 5,630,204—"Customer Premise Wireless Distribution of Broad Band Signals and Two-Way Communication of Control Signals Over Power Lines;" U.S. Pat. No. 5,554,968—"Data Communication Using Power Lines;" U.S. Pat. No. 5,452,344—"Communication Over Power Lines;" and U.S. Pat. No. 4,400,688—"Method and Apparatus for Communication Over Electric Power Lines," all incorporated herein by reference), and so will not be described herein.

Accordingly, referring initially to FIG. 1, illustrated is an exemplary embodiment of an inventive electrical device 1, which is coupled to a site electrical power supply system 100. In this embodiment, the electrical device 1 is provided with a module 200 through which remaining circuitry 300 of the electrical device 1 is coupled to the site electrical power supply system 100.

When the electrical device 1 is turned on by closing a switch 72, the module 200 scans for a digital code transmitted via the electrical supply system. For this purpose, a receiver 10 is provided. When a signal is received, a digital code contained therein is extracted by an extractor 20. A comparator 40 compares the extracted digital code to a digital code stored in a non-volatile memory 30.

The illustrated embodiment of the module 200 includes a switch 74 by means of which the remaining circuitry 300 can be alternatively coupled to or decoupled from the site electrical power supply system 100. The switch 74 is controlled by a controller 50. After a defined time interval, controlled by a timer 60, the comparator 40 provides the comparison result to the controller 50. If matching codes have been detected, the switch 74 is closed by the controller 50, thereby enabling unrestricted operation of the remaining circuitry 300. Otherwise the electrical device 1 is turned off by means of the switch 74.

The illustrated embodiment of the electrical device 1 is provided with two operating states. In a first operating state, or "sale" state, no or a default digital code is stored in the memory 30. If the comparator 40 detects that the default code or no code, e.g., all zeros, is stored in the memory 30 and does not detect a received code, the comparator 40 provides the information of matching codes to the controller 50. If, however, a code is received by the receiver 10 and extracted by the extractor 20 and no or the default code is stored in the memory 30, then this code is stored in the memory 30, thereby changing the electrical device 1 into a second operating state, or "locked" state. After having stored a received code which is different from the default code in the memory 30, in any future process of turning on the electrical device 1, unrestricted operation is only provided when a matching code is received.

Figure 2:
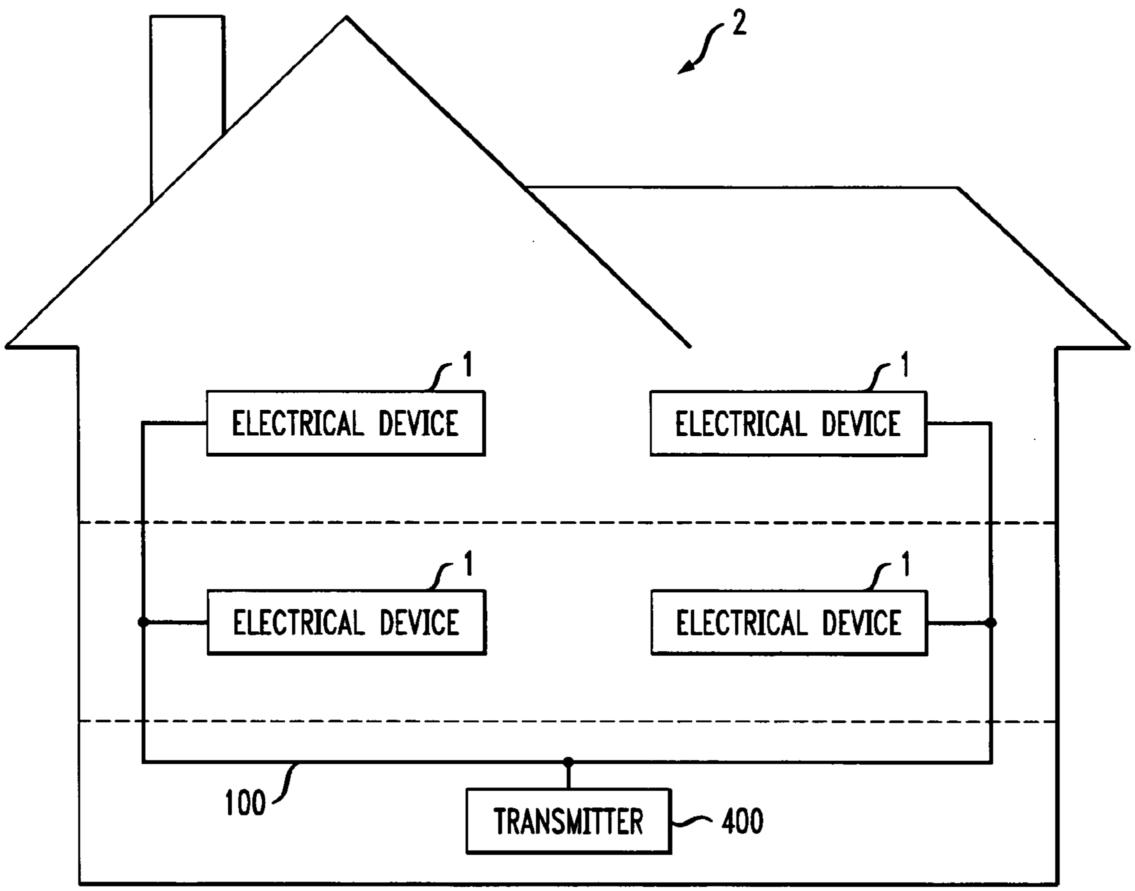
FIG. 2 illustrates a high-level block diagram of one embodiment of a system for protecting the electronic device constructed according. to the principles of the present invention.

Turning now to FIG. 2, illustrated is an exemplary embodiment of an anti-theft system 2. The anti-theft system 2 is illustrated as including a site electrical power supply system 100 to which a transmitting device 400 and four electrical devices 1 are coupled.

In this embodiment, the transmitting device 400 is provided with non-volatile memory (not shown) in which a reference code is stored. This reference code is transmitted periodically in pre-defined time intervals via the electrical power supply within a broadcast signal. The broadcast signal is received by all four electrical devices 1. Only when the reference code transmitted by device 400 matches with corresponding codes stored in the four electrical. devices 1, unrestricted operation of the four electrical devices 1 is provided.

Figure 3:
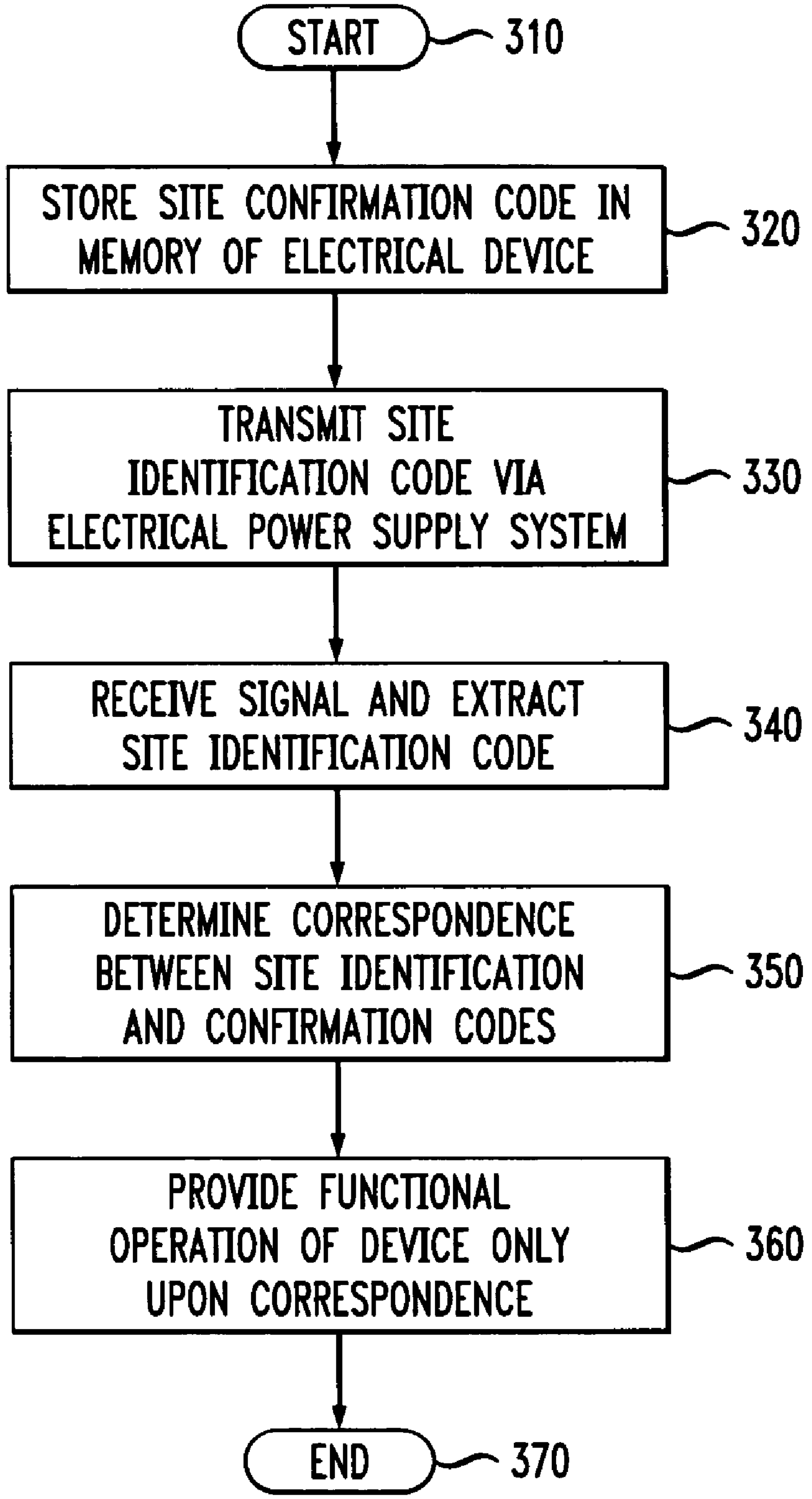
FIG. 3 illustrates a flow diagram of one embodiment of a method of protecting the electronic device carried out according to the principles of the present invention.

Turning now to FIG. 3, illustrated is a flow diagram of one embodiment of a method of protecting the electronic device carried out according to the principles of the present invention. The method begins in a start step 310, wherein it is desired to protect at least one electrical device connectable to a site electrical power supply system.

In a step 320, a site confirmation code is stored in memory of the at least one electrical device. As described above, the site confirmation code may be stored, for example, by a manufacturer or in a configuration process undertaken by a customer. In a step 330, a signal including a site identification code is transmitted via the site electrical power supply system.

In a step 340, the signal is received, and the site identification code is extracted from the signal by the at least one electrical device. In a step 350, a correspondence between the site identification code and the site confirmation code is determined. In a step 360, unrestricted operation of the at least one electrical device is provided only when the site identification and site confirmation codes correspond. In one embodiment, the two codes must match. The method ends in an end step 370.

Although the present invention has been described in detail, those skilled in the pertinent art should understand that they can make various changes, substitutions and alterations herein without departing from the spirit and scope of the invention in its broadest form.

What is claimed is:

1. A method of restricting operation of at least one electrical device connectable to a site electrical power supply system, comprising:

closing a first switch between said site electrical power supply system and a second switch;

receiving a signal including a site identification code via said site electrical power supply system and extracting said site identification code by said at least one electrical device;

determining a correspondence between said site identification code and a site confirmation code stored in a memory of said at least one electrical device;

closing said second switch between said first switch and functional circuitry of said at least one electrical device when said determination indicates said site identification code and said site confirmation code correspond; and allowing unrestricted operation by said functional circuitry of said at least one electrical device when both said first switch and said second switch are closed.

2. The method as recited in claim 1 wherein said storing said site confirmation code comprises changing said at least one electrical device from a first operating state to a second operating state wherein, in said first operating state, said unrestricted operation of said at least one electrical device is unrestricted.

3. The method as recited in claim 1 wherein said site confirmation code is automatically stored in said memory of said at least one electrical device when said signal comprising said site confirmation code is received a first time.

4. The method as recited in claim 1 wherein said signal is a broadcast signal received by substantially all electrical devices coupled to said site electrical power supply system.

5. The method as recited in claim 4 wherein said site identification code uniquely identifies said transmitting device.

6. The method as recited in claim 1 wherein said site identification and site confirmation codes are digital codes of pre-defined length.

7. The method as recited in claim 1 wherein said site identification code is unchangeably stored in a transmitting device by a manufacturer thereof.

8. The method as recited in claim 1 wherein said site identification code is manually entered into a transmitting device by a user.

9. The method as recited in claim 1 wherein a transmitting device is detachably coupled to said site electrical power supply system and provides said site identification code.

10. The method as recited in claim 1 wherein said receiving is performed via a conventional network protocol selected from the group consisting of:

TCP/IP,

NetBEUI, and

IPX/SPX protocols.

11. An electrical device connectable to a site electrical power supply system, comprising:

a first switch;

a module connected to said first switch, said module including:

a memory configured to store at least one site confirmation code;

a receiver coupled to said memory and said first switch and configured to receive a signal transmitted by a transmitting device via said site electrical power supply system;

an extractor coupled to said receiver and configured to extract a site identification code from a received signal;

a comparator coupled to said extractor and configured to determine a correspondence between said site identification and said site confirmation codes; and a controller coupled to said comparator and configured to close a second switch when said site identification and site confirmation codes correspond; and functional circuitry configured to allow unrestricted operation of said electrical device when both said first switch and said second switch are closed.

12. The electrical device as recited in claim 11 wherein said controller is configured to turn said electrical device off when said site identification and site confirmation codes fail to correspond.

13. The electrical device as recited in claim 11 wherein said electrical device is provided with first and second operating states, said first operating state providing said unrestricted operation.

14. The electrical device as recited in claim 13 wherein, in said first operating state, said electrical device is configured to receive said signal comprising said site confirmation code, extract said site confirmation code and automatically store said site confirmation code in said memory.

15. The electrical device as recited in claim 13 wherein said electrical device changes from said first operating state to said second operating state when said signal comprising said site confirmation code is received a first time.

16. The electrical device as recited in claim 12 wherein said electrical device is configured for manual entry of said site confirmation code.

17. The electrical device as recited in claim 12 wherein said electrical device is configured to receive data via a conventional network protocol selected from the group consisting of:

TCP/IP,

NetBEUI, and

IPX/SPX protocols.

18. A transmitting device connectable to a site electrical power supply system, comprising:

a signal generator configured to generate a signal that includes a site identification code receivable by at least one electrical device wherein said electrical device is electrically coupled to said site electrical power supply system when a first switch of said electrical device is closed, and wherein functional circuitry of said electrical device allows unrestricted operation of said electrical device when both said first switch and a second switch are closed, said second switch closing when said site identification code and a site confirmation code stored in a memory of said electrical device correspond; and a transmitter coupled to said signal generator and configured to transmit said signal via said site electrical power supply system.

19. The transmitting device as recited in claim 18 wherein said signal is a broadcast signal receivable by all electrical devices coupled to said site electrical power supply system.

20. The transmitting device as recited in claim 18 wherein said site identification code is unchangeably stored in said transmitting device by a manufacturer.

21. The transmitting device as recited in claim 18 wherein said site identification code uniquely identifies said transmitting device.

* * * * *